US012775547B2

(12) United States Patent
Baek et al.

(10) Patent No.: US 12,775,547 B2
(45) Date of Patent: Oct. 27, 2026

(54) STORAGE DEVICE DETERMINING WHETHER TO EXECUTE TARGET OPERATION ON DATA ON THE BASIS OF COMPENSATION TIME, AND OPERATING METHOD THEREOF

(71) Applicant: SK hynix Inc., Gyeonggi-do (KR)

(72) Inventors: Young Jin Baek, Gyeonggi-do (KR); Jeong Myung Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 148 days.

(21) Appl. No.: 18/943,907

(22) Filed: Nov. 12, 2024

(65) Prior Publication Data

US 2025/0390427 A1 Dec. 25, 2025

(30) Foreign Application Priority Data

Jun. 24, 2024 (KR) ........................ 10-2024-0082074

(51) Int. Cl.
*G11C 29/42* (2006.01)
*G06F 12/02* (2006.01)

(52) U.S. Cl.
CPC ................................ *G06F 12/0223* (2013.01)

(58) Field of Classification Search
CPC ...................................................... G11C 29/42
See application file for complete search history.

(56) References Cited

U.S. PATENT DOCUMENTS

2024/0069790 A1* 2/2024 Ahn ....................... G11C 29/42

FOREIGN PATENT DOCUMENTS

KR 10-2018-0043924 A 5/2018
KR 10-2018-0070974 A 6/2018

* cited by examiner

*Primary Examiner* — Jason Lappas
(74) *Attorney, Agent, or Firm* — IP&T GROUP LLP

(57) ABSTRACT

A storage device may include a memory and a controller. The memory may store data. The controller may determine a plurality of temperature values corresponding to a plurality of time periods, respectively, calculate a plurality of weights corresponding to the plurality of temperature values, respectively, calculate a compensation time based on the plurality of time periods and the plurality of weights, and execute a target operation on the data, based on the compensation time.

20 Claims, 7 Drawing Sheets

STORAGE DEVICE DETERMINING WHETHER TO EXECUTE TARGET OPERATION ON DATA ON THE BASIS OF COMPENSATION TIME, AND OPERATING METHOD THEREOF

CROSS-REFERENCE TO RELATED APPLICATION

The present application claims priority under 35 U.S.C. § 119(a) to Korean Patent Application No. 10-2024-0082074 filed on Jun. 24, 2024, which is incorporated herein by reference in its entirety.

BACKGROUND

1. Technical Field

Embodiments of the present disclosure relate to a storage device which determines whether to execute a target operation on data, based on a compensation time, and an operating method thereof.

2. Related Art

A storage device stores data according to a request from an external device such as a computer, a mobile terminal (e.g., a smart phone or tablet), or the like.

A storage device may include a memory for storing data therein and a controller for controlling the memory. The memory may be a volatile memory or a non-volatile memory. The controller may receive a command from an external device (i.e., a host), and execute or control operations to read data from the memory, write, or erase data in the memory according to the received command.

As time passes, data which continuously remains stored in a certain location in the memory is susceptible to occurrence of a fail due to retention. Therefore, the storage device needs to perform an operation of preventing a fail due to retention by the passage of time.

When the storage device is placed in a high or low temperature environment (e.g., a warehouse) with different retention characteristics for a long period of time, the storage device might not reflect a temperature change, which may result in a retention-related fail.

SUMMARY

Embodiments of the present disclosure are directed to providing a storage device capable of reducing the possibility of occurrence of a fail due to retention in a state in which the storage device is placed in a high or low temperature environment for a long period of time, and an operating method thereof.

In an embodiment of the present disclosure, a storage device may include a memory configured to store data; and a controller configured to determine a plurality of temperature values corresponding to a plurality of time periods, respectively, calculate a plurality of weights corresponding to the plurality of temperature values, respectively, calculate a compensation time based on the plurality of time periods and the plurality of weights, and execute a target operation on the data, based on the compensation time.

In another embodiment of the present disclosure, a method for operating a storage device may include determining a plurality of temperature values corresponding to a plurality of time periods, respectively; calculating a plurality of weights corresponding to the plurality of temperature values, respectively; calculating a compensation time based on the plurality of time periods and the plurality of weights; and executing a target operation on data stored in a memory, based on the compensation time.

According to the embodiments of the present disclosure, it is possible to reduce the possibility of occurrence of a fail due to retention in a state in which a storage device is placed in a high or low temperature environment for a long period of time.

DETAILED DESCRIPTION

Figure 1:
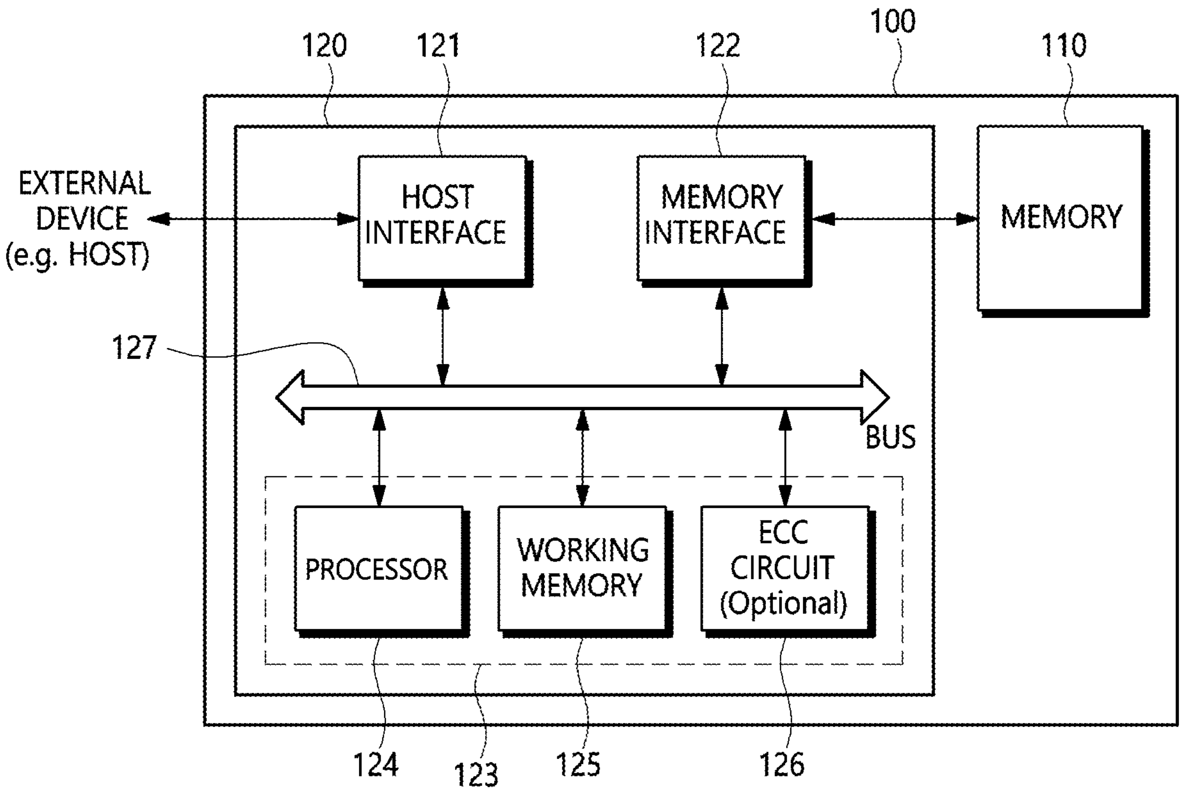
FIG. 1 is a schematic configuration diagram of a storage device according to an embodiment of the present disclosure.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily limited to the same embodiment(s). The term "embodiments" when used herein does not necessarily refer to all embodiments.

Various embodiments of the present disclosure are described below in more detail with reference to the accompanying drawings. However, the embodiments of the present disclosure may be embodied in different forms and variations and should not be construed as being limited to the embodiments set forth herein. Rather, the described embodiments are provided so that this disclosure will be thorough and complete, and will fully convey the scope of the present disclosure to those skilled in the art to which this disclosure pertains. Throughout this disclosure, like reference numerals refer to like parts throughout the various figures and embodiments of the present disclosure.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a schematic configuration diagram of a storage device 100 according to an embodiment of the present disclosure.

Referring to FIG. 1, the storage device 100 may include a memory 110 that stores data and a controller 120 that controls the memory 110.

The memory 110 includes a plurality of memory blocks, and operates in response to the control of the controller 120. Operations of the memory 110 may include, for example, a read operation, a program operation (also referred to as a write operation) and an erase operation.

The memory 110 may include a memory cell array including a plurality of memory cells (also simply referred to as "cells") that store data.

For example, the memory 110 may be realized in various types of memory such as a double data rate synchronous dynamic random access memory (DDR SDRAM), a low power double data rate 4 (LPDDR4) SDRAM, a graphics double data rate (GDDR) SDRAM, a low power DDR (LPDDR), a Rambus dynamic random access memory (RDRAM), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM) and a spin transfer torque random access memory (STT-RAM).

The memory 110 may be implemented as a three-dimensional array structure. For example, embodiments of the present disclosure may be applied to a charge trap flash (CTF) in which a charge storage layer is configured by a dielectric layer and a flash memory in which a charge storage layer is configured by a conductive floating gate.

The memory 110 may receive a command and an address from the controller 120 and may access an area in the memory cell array that is selected by the address. The memory 110 may perform an operation indicated by the command, on the area of the memory cell array selected by the address.

The memory 110 may perform a program operation, a read operation or an erase operation. For example, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase and background operations for the memory 110. For example, background operations may include at least one of a garbage collection (GC) operation, a wear leveling (WL) operation, a read reclaim (RR) operation, a bad block management (BBM) operation, and so forth.

The controller 120 may control the operation of the memory 110 according to a request from an external device (e.g., a host) located outside the storage device 100. The controller 120, however, also may control the operation of the memory 110 regardless of a request of the host.

The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, a radio frequency identification (RFID) device, and a mobility device (e.g., a vehicle, a robot or a drone) capable of driving under human control or autonomous driving, as non-limiting examples. Alternatively, the host may be a virtual reality (VR) device providing 2D or 3D virtual reality images or an augmented reality (AR) device providing augmented reality images. The host may be any of various electronic devices that require the storage device 100 capable of storing data.

The host may include at least one operating system (OS). The operating system may generally manage and control the function and operation of the host, and may control interoperability between the host and the storage device 100. The operating system may be classified into a general operating system and a mobile operating system depending on the mobility of the host.

The controller 120 and the host may be separated from each other. Alternatively, the controller 120 and the host may be integrated into one device. Hereunder, for convenience, descriptions will describe the controller 120 and the host as devices that are separated from each other.

Referring to FIG. 1, the controller 120 may include a memory interface 122 and a control circuit 123, and may further include a host interface 121.

The host interface 121 provides an interface for communication with the host. For example, the host interface 121 provides an interface that uses at least one of various communication interfaces or standards such as a universal serial bus (USB) protocol, a multimedia card (MMC) protocol, a peripheral component interconnection (PCI) protocol, a PCI-express (PCI-e or PCIe) protocol, an advanced technology attachment (ATA) protocol, a serial-ATA protocol, a parallel-ATA protocol, a small computer system interface (SCSI) protocol, an enhanced small disk interface (ESDI) protocol, an integrated drive electronics (IDE) protocol and a private protocol.

When receiving a command from the host, the control circuit 123 may receive the command through the host interface 121, and may perform an operation of processing the received command.

The memory interface 122 may be coupled with the memory 110 to provide an interface for communication with the memory 110. That is, the memory interface 122 may be configured to provide an interface between the memory 110 and the controller 120 in response to the control of the control circuit 123.

The control circuit 123 performs the general control operations of the controller 120 to control the operation of the memory 110. To this end, for instance, the control circuit 123 may include at least one of a processor 124 and a working memory 125, and may optionally include an error detection and correction circuit (ECC circuit) 126.

The processor 124 may control general operations of the controller 120, and may perform a logic operation. The processor 124 may communicate with the host through the host interface 121, and may communicate with the memory 110 through the memory interface 122.

The processor 124 may execute logical operations required to perform the function of a flash translation layer (FTL). The processor 124 may translate a logical block address (LBA), provided by the host, into a physical block address (PBA) through the flash translation layer. The flash translation layer may receive the logical block address and translate the logical block address into the physical block address, by using a mapping table.

There are various address mapping methods of the flash translation layer, depending on a mapping unit. Representative address mapping methods include a page mapping method, a block mapping method and a hybrid mapping method.

The processor 124 may randomize data received from the host. For example, the processor 124 may randomize data received from the host by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control the operation of the controller 120. Namely, to control the general operation of the controller 120 and perform a logic operation, the processor 124 may execute (drive) firmware loaded in the working memory 125 upon booting. Hereafter, an operation of the storage device 100 according to embodiments of the present disclosure will be described as implementing a processor 124 that executes firmware in which the corresponding operation is defined.

Firmware is a program to be executed in the storage device 100 to drive the storage device 100. Firmware may include various functional layers. For example, the firmware may include binary data in which codes for executing the functional layers, respectively, are defined.

For example, the firmware may include at least one of a flash translation layer, a host interface layer (HIL) and a flash interface layer (FIL). The flash translation layer performs a translating function between a logical address requested to the storage device 100 from the host and a physical address of the memory 110. The host interface layer serves to analyze a command requested to the storage device 100 as a storage device from the host and transfer the command to the flash translation layer. The flash interface layer transfers, to the memory 110, a command, instructed from the flash translation layer.

Such firmware may be loaded in the working memory 125 from the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic operation, which is defined in the firmware loaded in the working memory 125, to control the general operation of the controller 120. The processor 124 may store, in the working memory 125, a result of performing the logic operation defined in the firmware. The processor 124 may control the controller 120 according to a result of performing the logic operation defined in the firmware such that the controller 120 generates a command or a signal. When a part of firmware, in which a logic operation to be performed is defined, is stored in the memory 110, but not loaded in the working memory 125, the processor 124 may generate an event (e.g., an interrupt) for loading the corresponding part of the firmware into the working memory 125 from the memory 110.

The processor 124 may load, from the memory 110, metadata necessary for driving firmware. The metadata, as data for managing the memory 110, may include for example management information on user data stored in the memory 110.

Firmware may be updated while the storage device 100 is manufactured or while the storage device 100 is operating. The controller 120 may download new firmware from the outside of the storage device 100 and update existing firmware with the new firmware.

To drive the controller 120, the working memory 125 may store necessary firmware, a program code, a command and data. The working memory 125 may be a volatile memory that includes, for example, at least one of a static RAM (SRAM), a dynamic RAM (DRAM) and a synchronous DRAM (SDRAM). The controller 120 may additionally use a separate volatile memory (e.g. SRAM, DRAM) located outside the controller 120 in addition to the working memory 125.

The error detection and correction circuit 126 may detect an error bit of target data, and correct the detected error bit by using an error correction code. The target data may be, for example, data stored in the working memory 125 or data read from the memory 110.

The error detection and correction circuit 126 may decode data by using an error correction code. The error detection and correction circuit 126 may be realized by various code decoders. For example, a decoder that performs unsystematic code decoding or a decoder that performs systematic code decoding may be used.

For example, the error detection and correction circuit 126 may detect an error bit by the unit of a set sector in each of the read data, when each read data is constituted by a plurality of sectors. A sector may mean a data unit that is smaller than a page, which is the read unit of a flash memory. Sectors constituting each read data may be matched with one another using an address.

The error detection and correction circuit 126 may calculate a bit error rate (BER), and may determine whether an error is correctable or not, by sector units. For example, when a bit error rate is greater than a reference value, the error detection and correction circuit 126 may determine that a corresponding sector is uncorrectable or a fail. When a bit error rate is less than the reference value, the error detection and correction circuit 126 may determine that a corresponding sector is correctable or a pass.

The error detection and correction circuit 126 may perform an error detection and correction operation sequentially for all read data. If a sector included in read data is correctable, the error detection and correction circuit 126 may omit an error detection and correction operation for a corresponding sector for next read data. If the error detection and correction operation for all read data is ended in this way, then the error detection and correction circuit 126 may detect a sector which is uncorrectable in read data last. There may be one or more sectors that are determined to be uncorrectable. The error detection and correction circuit 126 may transfer information (e.g., address information) regarding a sector which is determined to be uncorrectable to the processor 124.

A bus 127 may be configured to provide channels among the components 121, 122, 124, 125 and 126 of the controller 120. The bus 127 may include, for example, a control bus for transferring various control signals, commands and the like, a data bus for transferring various data, and so forth.

Some components among the above-described components 121, 122, 124, 125 and 126 of the controller 120 may be omitted, or some components among the above-described components 121, 122, 124, 125 and 126 of the controller 120 may be integrated into one component. In addition to the above-described components 121, 122, 124, 125 and 126 of the controller 120, one or more other components may be added.

Hereinbelow, the memory 110 will be described in further detail with reference to FIG. 2.

Figure 2:
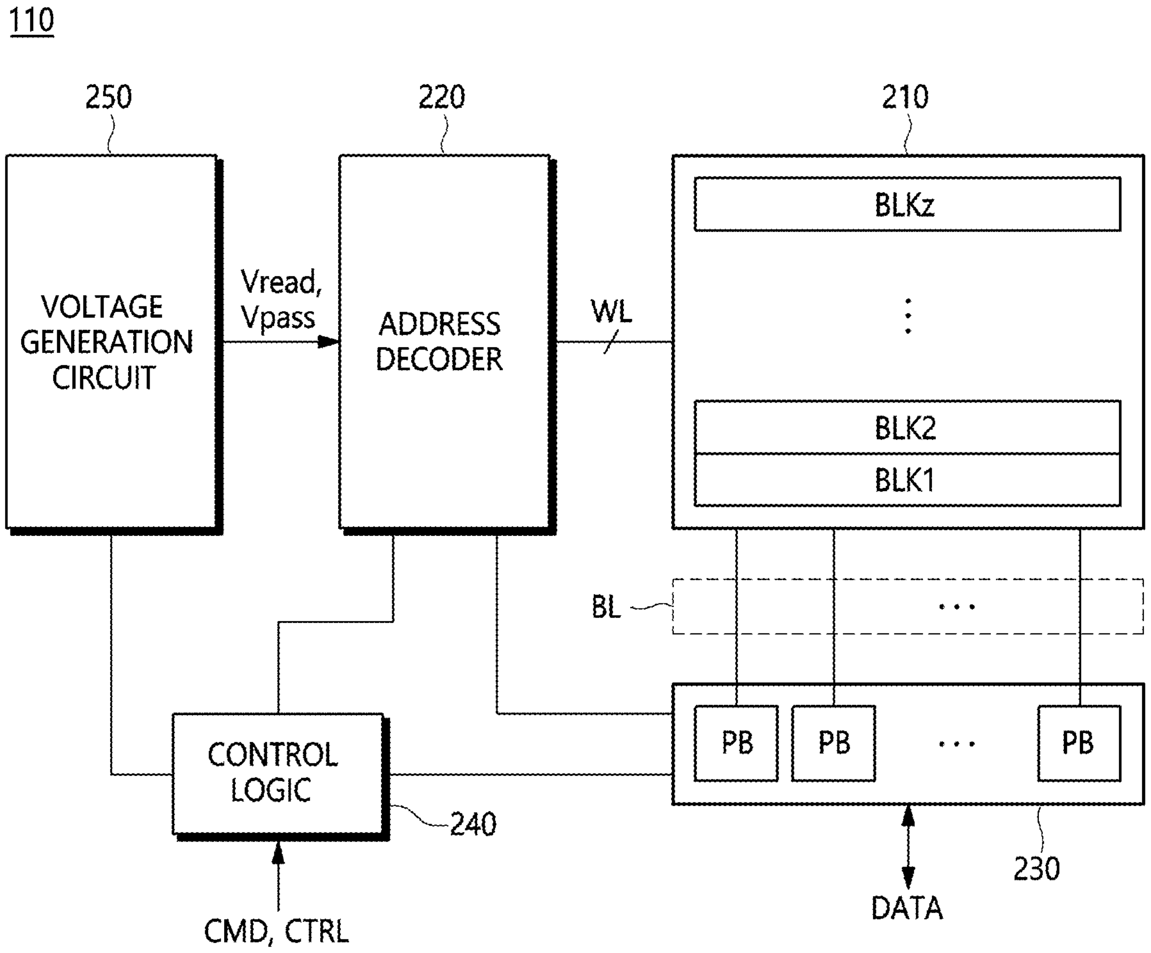
FIG. 2 is a block diagram schematically illustrating a memory of FIG. 1.

FIG. 2 is a block diagram schematically illustrating a memory 110 of FIG. 1.

Referring to FIG. 2, the memory 110 may include a memory cell array 210, an address decoder 220, a read and write circuit 230, a control logic 240, and a voltage generation circuit 250.

The memory cell array 210 may include a plurality of memory blocks BLK1 to BLKz, where z is a natural number of 2 or greater.

Each of the plurality of memory blocks BLK1 to BLKz may include a plurality of memory cells, which is arranged between a plurality of word lines WL and a plurality of bit lines BL.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells that have vertical channel structures.

The memory cell array 210 may be configured by a memory cell array of a two-dimensional structure or may be configured by a memory cell array of a three-dimensional structure.

Each of the plurality of memory cells included in the memory cell array 210 may store at least 1-bit data. For instance, each of the plurality of memory cells may be a single level cell (SLC) that stores 1-bit data. In another instance, each of the plurality of memory cells may be a multi-level cell (MLC) that stores 2-bit data. In still another instance, each of the plurality of memory cells may be a triple level cell (TLC) that stores 3-bit data. In yet another instance, each of the plurality of memory cells may be a quad level cell (QLC) that stores 4-bit data. In a further instance, the memory cell array 210 may include a plurality of memory cells, each of which stores 5 or more-bit data.

The number of bits of data stored in each of the plurality of memory cells may be dynamically determined. For example, a single-level cell that stores 1-bit data may be changed to a triple-level cell that stores 3-bit data.

The address decoder 220, the read and write circuit 230, the control logic 240 and the voltage generation circuit 250 may operate as a peripheral circuit that drives the memory cell array 210.

The address decoder 220 may be coupled to the memory cell array 210 through the plurality of word lines WL.

The address decoder 220 may operate in response to the control of the control logic 240.

The address decoder 220 may receive an address through an input/output buffer in the memory 110. The address decoder 220 may decode a block address in the received address. The address decoder 220 may select at least one memory block depending on the decoded block address.

The address decoder 220 may receive a read voltage Vread and a pass voltage Vpass from the voltage generation circuit 250.

During a read operation, the address decoder 220 may apply the read voltage Vread to a selected word line WL in a selected memory block, and may apply the pass voltage Vpass to the remaining unselected word lines WL.

During a program verify operation, the address decoder 220 may apply a verify voltage generated by the voltage generation circuit 250 to a selected word line WL, and may apply the pass voltage Vpass to the remaining unselected word lines WL.

The address decoder 220 may decode a column address in the received address. The address decoder 220 may transmit the decoded column address to the read and write circuit 230.

A read operation and a program operation of the memory 110 may be performed by the unit of a page. An address received when a read operation or a program operation is requested may include at least one of a block address, a row address and a column address.

The address decoder 220 may select one memory block and one word line depending on a block address and a row address, respectively. A column address may be decoded by the address decoder 220 and be provided to the read and write circuit 230.

The address decoder 220 may include at least one of a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit that includes a plurality of page buffers PB. The read and write circuit 230 may include data buffers that take charge of a data processing function, and may further include cache buffers that take charge of a caching function.

The plurality of page buffers PB may be coupled to the memory cell array 210 through the plurality of bit lines BL. In a read operation and a program verify operation, the plurality of page buffers PB may continuously supply sensing current to bit lines BL coupled with memory cells to sense threshold voltages (Vth) of the memory cells, and may latch sensing data by sensing, through sensing nodes, changes in the amounts of current flowing, depending on the programmed states of the corresponding memory cells.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory 110. In an embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may be configured to control general operations of the memory 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. In a read operation, the voltage generation circuit 250 may generate the read voltage Vread and the pass voltage Vpass, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

For a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. In another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell may include a drain, a source, and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate, which is surrounded by a dielectric, and a control gate to which a gate voltage is applied from a word line WL.

In each memory block, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

At least one dummy word line may be additionally disposed between the first outermost word line and the first select line. At least one dummy word line may also be additionally disposed between the second outermost word line and the second select line.

A read operation and a program operation (write operation) of the memory block described above may be performed by the unit of a page, and an erase operation may be performed by the unit of a memory block.

Figure 3:
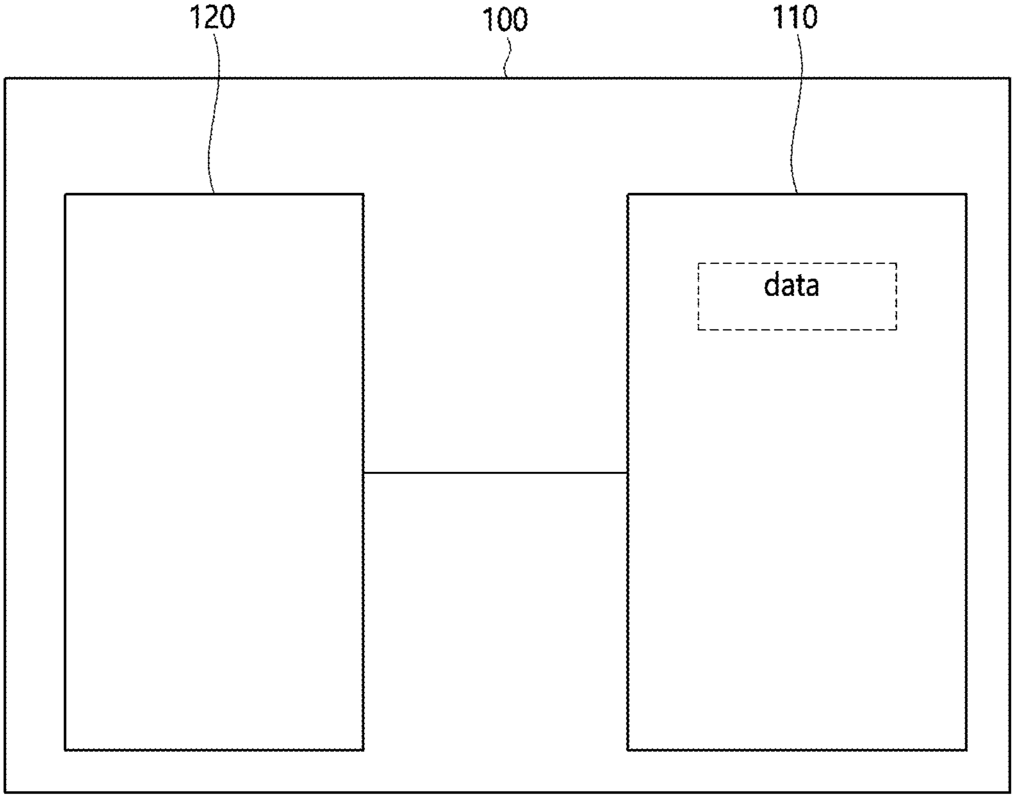
FIG. 3 is a diagram illustrating the schematic structure of a storage device according to embodiments of the present disclosure.

FIG. 3 is a diagram illustrating the schematic structure of a storage device 100 according to embodiments of the present disclosure.

Referring to FIG. 3, the storage device 100 may include a memory 110 and a controller 120.

The memory 110 may store data. Data may be stored in a first area of the memory 110. The first area may include one or more memory blocks or one or more pages.

The controller 120 may control the memory 110. In the embodiments of the present disclosure, the controller 120 may calculate a compensation time and determine whether to execute a target operation on the data, based on the calculated compensation time.

The target operation may include an operation of preventing a retention error that is likely to occur when data continues to be stored in a certain area of the memory 110.

Figure 4:
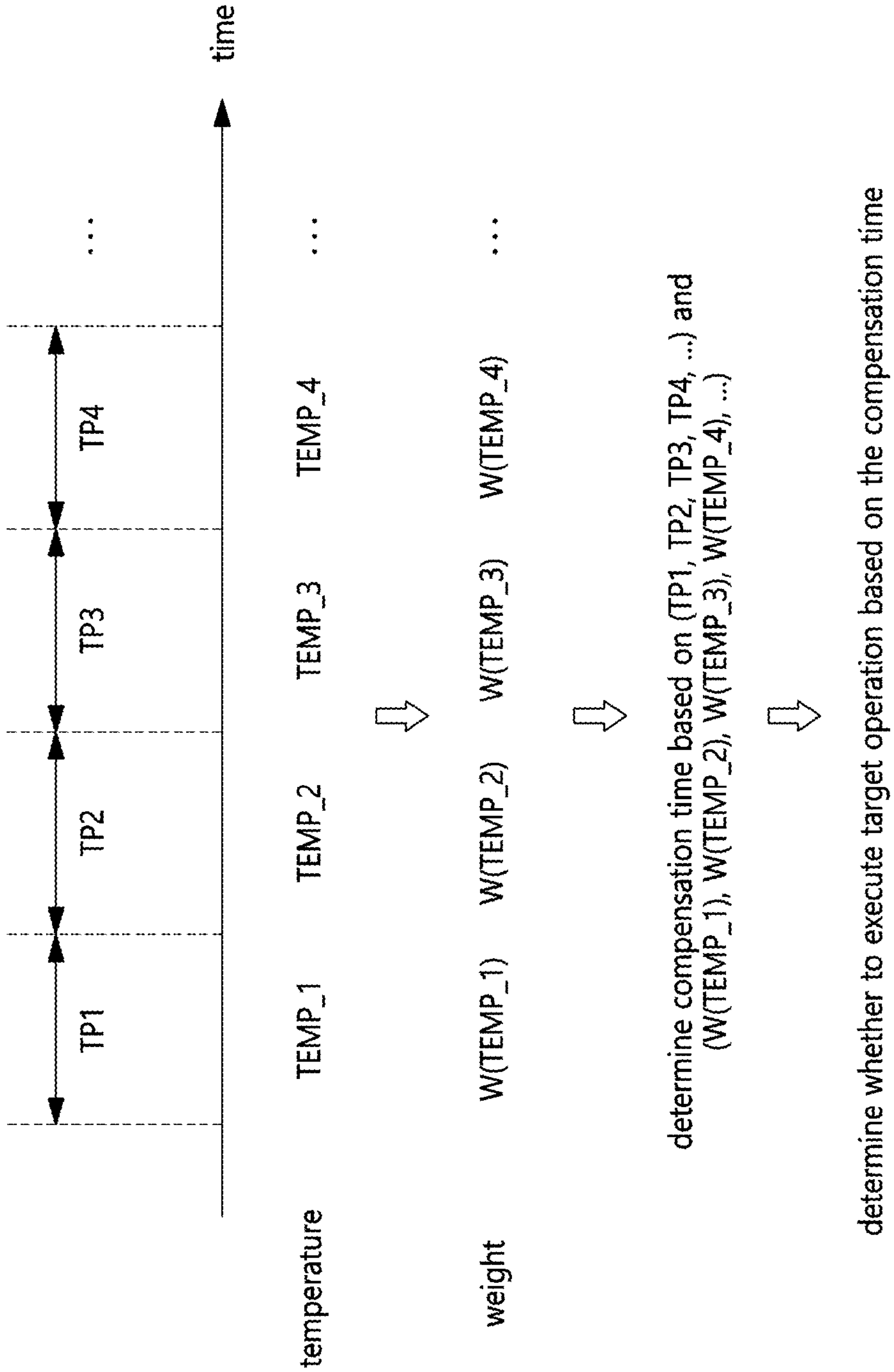
FIG. 4 is a diagram illustrating a schematic operation of the storage device according to the embodiments of the present disclosure.

FIG. 4 is a diagram illustrating a schematic operation of the storage device 100 according to the embodiments of the present disclosure.

Referring to FIG. 4, the controller 120 of the storage device 100 may measure a plurality of temperature values TEMP_1, TEMP_2, TEMP_3, TEMP_4, . . . corresponding to a plurality of time periods TP1, TP2, TP3, TP4, . . . , respectively.

The plurality of time periods TP1, TP2, TP3, TP4, . . . may be continuous or subsequent time periods. The data stored in the memory 110 in the plurality of time periods TP1, TP2, TP3, TP4, . . . might not be migrated and may be continuously stored in the first area of the memory 110.

In the illustrate example of FIG. 4, the temperature value TEMP_1 corresponds to the time period TP1, the temperature value TEMP_2 corresponds to the time period TP2, the temperature value TEMP_3 corresponds to the time period TP3, and the temperature value TEMP_4 corresponds to the time period TP4.

Each of the plurality of temperature values TEMP_1, TEMP_2, TEMP_3, TEMP_4, . . . may be measured by a temperature sensor. The temperature sensor may measure the temperature of the controller 120 or the temperature of the memory 110.

Time points at which the plurality of temperature values TEMP_1, TEMP_2, TEMP_3, TEMP_4, . . . are measured may also be determined in various ways.

For example, the plurality of temperature values TEMP_1, TEMP_2, TEMP_3, TEMP_4, . . . may be measured at the start, intermediate or end time points of the plurality of time periods TP1, TP2, TP3, TP4, . . . .

For another example, for each of the plurality of time periods TP1, TP2, TP3, TP4, . . . , a temperature may be measured at a time point when a specific operation (e.g., a read operation or a write operation) is executed in each time period and may be determined as a temperature value corresponding to the corresponding time period.

For still another example, for each of the plurality of time periods TP1, TP2, TP3, TP4, . . . , a plurality of temperature values may be measured in each time period, and an average value of the measured temperature values may be determined as a temperature value corresponding to the corresponding time period.

For yet another example, for each of the plurality of time periods TP1, TP2, TP3, TP4, . . . , each of the plurality of temperature values TEMP_1, TEMP_2, TEMP_3, TEMP_4, . . . may be measured according to a preset cycle.

The controller 120 may calculate a plurality of weights W(TEMP_1), W(TEMP_2), W(TEMP_3), W(TEMP_4), . . . corresponding to the plurality of temperature values TEMP_1, TEMP_2, TEMP_3, TEMP_4, . . . , respectively.

The controller 120 may manage the plurality of weights W(TEMP_1), W(TEMP_2), W(TEMP_3), W(TEMP_4), . . . in various ways.

For example, the controller 120 may manage calculated weights using a lookup table as shown in Table 1.

TABLE 1

| Index | Temperature | Weight |
|---|---|---|
| 0 | 112.5-117.5 | 4 |
| 1 | 107.5-112.5 | 4 |
| . . . | . . . | . . . |

TABLE 1-continued

| Index | Temperature | Weight |
|---|---|---|
| 18 | 22.5-27.5 | 1 |
| . . . | . . . | . . . |
| 27 | −22.5-−17.5 | 2 |
| 28 | −27.5-−22.5 | 2 |

The controller 120 may calculate a compensation time based on the plurality of time periods TP1, TP2, TP3, TP4, . . . and the plurality of weights W(TEMP_1), W(TEMP_2), W(TEMP_3), W(TEMP_4), . . . .

For example, the controller 120 may calculate, as the compensation time, the sum CT(TP1)+CT(TP2)+CT(TP3)+CT(TP4)+ . . . of weight times CT for the plurality of time periods TP1, TP2, TP3, TP4, . . . , respectively.

In some embodiments, a weight time CT(TP) for each time period TP is the product of a weight corresponding to each time period TP among the plurality of weights W(TEMP_1), W(TEMP_2), W(TEMP_3), W(TEMP_4), . . . and the length of each time period TP.

For example, the weight time CT(TP1) for the time period TP1 is determined as length (TP1)*W(TEMP_1), the weight time CT(TP2) for the time period TP2 is determined as length (TP2)*W(TEMP_2), the weight time CT(TP3) for the time period TP3 is determined as length (TP3)*W (TEMP_3), and the weight time CT(TP4) for the time period TP4 is determined as length (TP4)*W(TEMP_4).

Therefore, the compensation time is determined as the sum CT(TP1)+CT(TP2)+CT(TP3)+CT(TP4)+ . . . of weight times CT, i.e., length (TP1)*W(TEMP_1)+length (TP2)*W (TEMP_2)+length (TP3)*W(TEMP_3)+length (TP4)*W (TEMP_4)+ . . . .

By determining the compensation time in this way, the controller 120 may obtain a value similar to a time value used in an acceleration experiment for evaluating the storage device 100 by amplifying environmental conditions of the storage device 100.

The controller 120 may determine whether to execute a target operation on data, based on the compensation time. The target operation may include an operation of preventing a retention error that is likely to occur when the data continues to be stored in the first area of the memory 110 for the plurality of time periods TP1, TP2, TP3, TP4, . . . .

For example, the target operation may include an operation of migrating the data from the first area of the memory 110 where the data is stored to a second area of the memory 110, which is an arbitrary area different from the first area. By migrating the data from the first area to the second area, the controller 120 may prevent a retention error that is likely to occur when the data continues to be stored in the first area.

For another example, the target operation may include an operation of reading data stored in the first area of the memory 110 and then counting the number of error bits which occurred in the read data. When it is determined that the number of counted error bits is greater than a threshold value, the controller 120 may prevent a retention error by migrating the data from the first area of the memory 110 to the second area of the memory 110.

One embodiment of a method for obtaining the plurality of weights W(TEMP_1), W(TEMP_2), W(TEMP_3), W(TEMP_4), . . . will be described.

Figure 5:
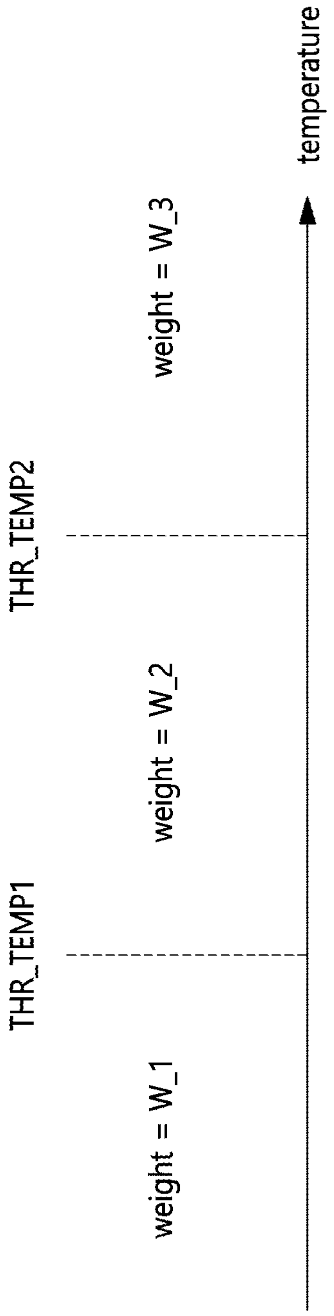
FIG. 5 is a diagram illustrating an operation in which the storage device according to the embodiments of the present disclosure determines weights corresponding to temperature values.

FIG. 5 is a diagram illustrating an operation in which the storage device 100 according to the embodiments of the present disclosure determines weights corresponding to temperature values.

In FIG. 5, the controller 120 of the storage device 100 may determine a weight corresponding to a temperature value as a first weight W_1, a second weight W_2 or a third weight W_3.

When it is determined that a temperature value is less than a first threshold temperature THR_TEMP1, the controller 120 may determine a weight corresponding to the temperature value as the first weight W_1. The first weight W_1 may be applied in a low temperature environment.

When it is determined that a temperature value is greater than or equal to the first threshold temperature THR_TEMP1 and is less than a second threshold temperature THR_TEMP2, the controller 120 may determine a weight corresponding to the temperature value as the second weight W_2. The second weight W_2 may be applied in a room temperature environment.

When it is determined that a temperature value is greater than the second threshold temperature THR_TEMP2, the controller 120 may determine a weight corresponding to the temperature value as the third weight W_3. The third weight W_3 may be applied in a high temperature environment.

The magnitudes of the first weight W_1, the second weight W_2 and the third weight W_3 may be determined as follows.

For example, the third weight W_3 may be greater than the first weight W_1 and the second weight W_2. Considering that a fail due to retention is highly likely to occur in a high temperature environment, the controller 120 may set the third weight W_3 applied to a high temperature to be greater than the first weight W_1 applied to a low temperature and the second weight W_2 applied to a room temperature.

The first weight W_1 may be greater than the second weight W_2. Considering that the possibility of occurrence of a fail due to retention in a low temperature environment is greater than in a room temperature environment, the controller 120 may set the first weight W_1 applied to a low temperature to be greater than the second weight W_2 applied to a room temperature.

One embodiment of a method in which the controller 120 determines whether to execute a target operation on data, based on a compensation time will be described.

Figure 6:
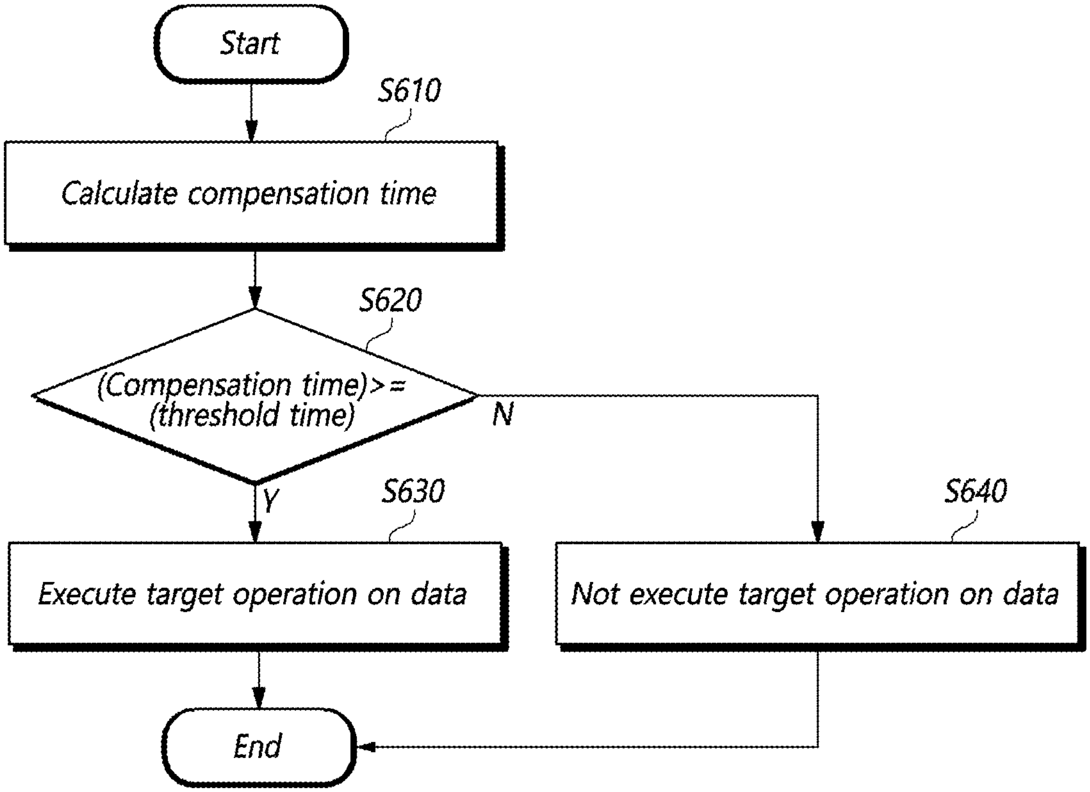
FIG. 6 is a flowchart illustrating an operation in which the storage device according to the embodiments of the present disclosure determines whether to execute a target operation, according to a compensation time.

FIG. 6 is a flowchart illustrating an operation in which the storage device 100 according to the embodiments of the present disclosure determines whether to execute a target operation, according to a compensation time.

Referring to FIG. 6, the controller 120 of the storage device 100 may calculate a compensation time (S610). The controller 120 may calculate the compensation time according to the embodiment of FIG. 4.

The controller 120 determines whether the compensation time is longer than or equal to a preset threshold time (S620).

When it is determined that the compensation time is longer than or equal to the threshold time (S620-Y), the controller 120 may determine to execute a target operation on data (S630). As described above, the target operation may include an operation for preventing a retention error.

When it is determined that the compensation time is shorter than the threshold time (S620-N), the controller 120 may determine not to execute a target operation on data (S640).

Figure 7:
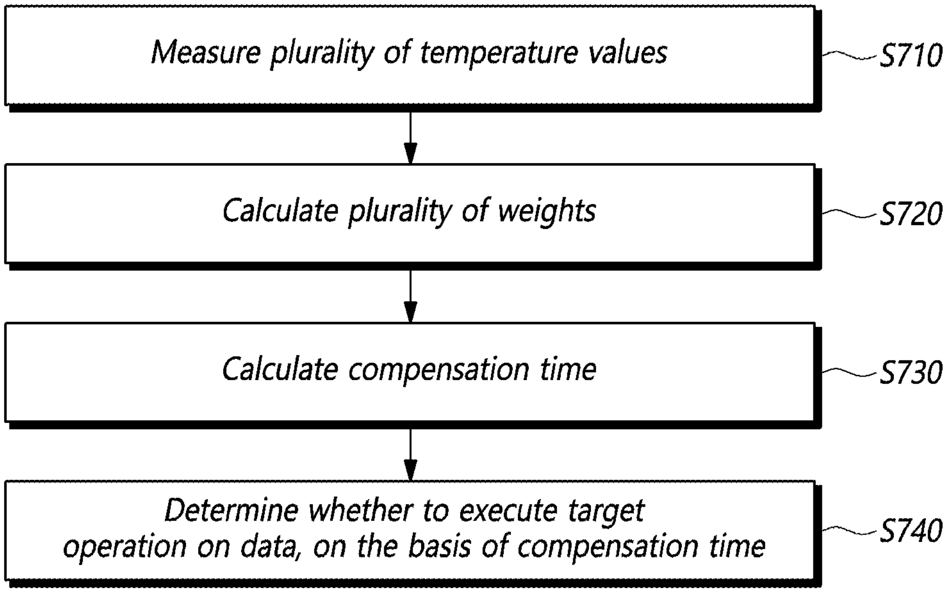
FIG. 7 is a flowchart illustrating a method for operating a storage device according to embodiments of the present disclosure.

FIG. 7 is a flowchart illustrating a method for operating the storage device 100 according to embodiments of the present disclosure.

Referring to FIG. 7, the method for operating the storage device 100 may include operation S710 of measuring a plurality of temperature values TEMP_1, TEMP_2, TEMP_3, TEMP_4, . . . corresponding to a plurality of time periods TP1, TP2, TP3, TP4, . . . , respectively.

The method for operating the storage device 100 may include operation S720 of calculating a plurality of weights W(TEMP_1), W(TEMP_2), W(TEMP_3), W(TEMP_4), . . . corresponding to the plurality of temperature values TEMP_1, TEMP_2, TEMP_3, TEMP_4, . . . , respectively.

For example, in the operation S720, for each of the plurality of temperature values TEMP_1, TEMP_2, TEMP_3, TEMP_4, . . . , a weight corresponding to each temperature value may be determined as a first weight W_1 when it is determined that each temperature value is less than a first threshold temperature THR_TEMP1. A weight corresponding to each temperature value may be determined as a second weight W_2 when it is determined that each temperature value is greater than or equal to the first threshold temperature THR_TEMP1 and is less than a second threshold temperature THR_TEMP2. A weight corresponding to each temperature value may be determined as a third weight W_3 when it is determined that each temperature value is greater than or equal to the second threshold temperature THR_TEMP2.

The third weight W_3 may be greater than the first weight W_1 and the second weight W_2. The first weight W_1 may be greater than the second weight W_2.

The method for operating the storage device 100 may include operation S730 of calculating a compensation time based on the plurality of time periods TP1, TP2, TP3, TP4, . . . and the plurality of weights W(TEMP_1), W(TEMP_2), W(TEMP_3), W(TEMP_4), . . . .

The operation S730 may calculate the sum of weight times for the plurality of time periods TP1, TP2, TP3, TP4, . . . as the compensation time. A weight time for each of the plurality of time periods TP1, TP2, TP3, TP4, . . . is the product of a weight corresponding to each time period among the plurality of weights W(TEMP_1), W(TEMP_2), W(TEMP_3), W(TEMP_4), . . . and the length of each time period.

The method for operating the storage device 100 may include operation S740 of determining whether to execute a target operation on data stored in the memory 110, based on the compensation time.

The operation S740 may determine to execute a target operation when it is determined that the compensation time is longer than or equal to a threshold time.

The target operation may be an operation of preventing a retention error that is likely to occur when data continues to be stored in a first area of the memory 110 for the plurality of time periods TP1, TP2, TP3, TP4, . . . .

For example, the target operation may include an operation of migrating data from the first area where the data is stored to a second area of the memory 110.

For another example, the target operation may include an operation of reading data from the first area and then counting the number of error bits which occurred in the read data.

Although embodiments of the present disclosure have been described for illustrative purposes, those skilled in the art will appreciate that various modifications, additions and substitutions are possible, without departing from the scope and spirit of the present disclosure. Therefore, the embodiments disclosed above and in the accompanying drawings should be considered in a descriptive sense only and not for limiting the technological scope. The technological scope of the present disclosure is not limited by the embodiments and the accompanying drawings. The spirit and scope of the present disclosure should be interpreted in connection with the appended claims and encompass all equivalents falling within the scope of the appended claims. Furthermore, the embodiments may be combined to form additional embodiments.

What is claimed is:

1. A storage device comprising:
- a memory configured to store data; and
- a controller configured to:
  - determine a plurality of temperature values corresponding to a plurality of time periods, respectively,
  - calculate a plurality of weights corresponding to the plurality of temperature values, respectively,
  - calculate a compensation time based on the plurality of time periods and the plurality of weights, and
  - execute a target operation on the data, based on the compensation time.

2. The storage device according to claim 1, wherein
- the controller calculates, as the compensation time, the sum of weight times for the plurality of time periods, respectively, and
- a weight time for each time period is determined as the product of a weight corresponding to each time period among the plurality of weights and the length of each time period.

3. The storage device according to claim 1, wherein the controller determines, as a first weight, a weight corresponding to each temperature value when it is determined that each temperature value is less than a first threshold temperature,
- determines, as a second weight, a weight corresponding to each temperature value when it is determined that each temperature value is greater than or equal to the first threshold temperature and is less than a second threshold temperature, and
- determines, as a third weight, a weight corresponding to each temperature value when it is determined that each temperature value is greater than or equal to the second threshold temperature.

4. The storage device according to claim 2, wherein the third weight is greater than the first weight and the second weight.

5. The storage device according to claim 4, wherein the first weight is greater than the second weight.

6. The storage device according to claim 1, wherein the controller executes the target operation when it is determined that the compensation time is longer than or equal to a threshold time.

7. The storage device according to claim 1, wherein the target operation includes an operation of preventing a retention error that is likely to occur when the data continues to be stored in a first area of the memory for the plurality of time periods.

8. The storage device according to claim 7, wherein the target operation includes an operation of migrating the data from the first area where the data is stored to a second area of the memory.

9. The storage device according to claim 7, wherein the target operation includes an operation of reading the data in the first area and then counting the number of error bits which occurred in the read data.

10. A method for operating a storage device, the method comprising:
- determining a plurality of temperature values corresponding to a plurality of time periods, respectively;
- calculating a plurality of weights corresponding to the plurality of temperature values, respectively;

calculating a compensation time based on the plurality of time periods and the plurality of weights; and executing a target operation on data stored in a memory, based on the compensation time.

11. The method according to claim 10, wherein calculating the compensation time includes calculating, as the compensation time, the sum of weight times for the plurality of time periods, respectively, and a weight time for each time period is determined as the product of a weight corresponding to each time period among the plurality of weights and the length of each time period.

12. The method according to claim 10, wherein calculating the plurality of weights includes determining, as a first weight, a weight corresponding to each temperature value when it is determined that each temperature value is less than a first threshold temperature, determining, as a second weight, a weight corresponding to each temperature value when it is determined that each temperature value is greater than or equal to the first threshold temperature and is less than a second threshold temperature, and determining, as a third weight, a weight corresponding to each temperature value when it is determined that each temperature value is greater than or equal to the second threshold temperature.

13. The method according to claim 12, wherein the third weight is greater than the first weight and the second weight.

14. The method according to claim 13, wherein the first weight is greater than the second weight.

15. The method according to claim 10, wherein executing the target operation includes executing the target operation when it is determined that the compensation time is longer than or equal to a threshold time.

16. The method according to claim 10, wherein the target operation includes an operation of preventing a retention error that is likely to occur when the data continues to be stored in a first area of the memory for the plurality of time periods.

17. The method according to claim 16, wherein the target operation includes an operation of migrating the data from the first area where the data is stored to a second area of the memory.

18. The method according to claim 16, wherein the target operation includes an operation of reading the data in the first area and then counting the number of error bits which occurred in the read data.

19. The storage device according to claim 1, further comprising a temperature sensor, wherein the plurality of temperature values is determined by measuring the plurality of temperature values of the storage device by the temperature sensor.

20. The method according to claim 10, wherein the determining of the plurality of temperature values includes measuring the plurality of temperature values of the storage device by a temperature sensor.

* * * * *